United States Patent
Guo et al.

(10) Patent No.: US 12,521,814 B2
(45) Date of Patent: Jan. 13, 2026

(54) SOLID STATE ADDITIVE METHOD

(71) Applicants: INSTITUTE FOR THE DEVELOPMENT AND QUALITY, MACAU, Macau (CN); AEROSPACE ENGINEERING EQUIPMENT (SUZHOU) CO., LTD., Suzhou (CN)

(72) Inventors: Dawei Guo, Macau (CN); Wenxiao Li, Suzhou (CN); Zhixiong Zhu, Suzhou (CN); Xiaoxia Xu, Suzhou (CN); Hu Wang, Suzhou (CN); Guoshun Yang, Suzhou (CN); Chitat Kwok, Macau (CN); Lapmou Tam, Macau (CN)

(*) Notice: Subject to any disclaimer, the term of this patent is extended or adjusted under 35 U.S.C. 154(b) by 0 days.

(21) Appl. No.: 19/018,417

(22) Filed: Jan. 13, 2025

(65) Prior Publication Data
US 2025/0144738 A1 May 8, 2025

Related U.S. Application Data

(63) Continuation of application No. PCT/CN2023/118603, filed on Sep. 13, 2023.

(30) Foreign Application Priority Data

Sep. 14, 2022 (CN) .......................... 202211113441.3
Sep. 30, 2022 (CN) .......................... 202211207163.8

(51) Int. Cl.
*B23K 20/00* (2006.01)
*B23K 20/12* (2006.01)
*B33Y 10/00* (2015.01)

(52) U.S. Cl.
CPC ...... *B23K 20/1215* (2013.01); *B23K 20/1235* (2013.01); *B33Y 10/00* (2014.12)

(58) Field of Classification Search
CPC ......... B33Y 10/00; B33Y 30/00; B33Y 50/02; B23K 20/1215; B23K 20/128; B23K 20/122; B23K 20/1205; B23K 20/129
See application file for complete search history.

(56) References Cited

U.S. PATENT DOCUMENTS 8,893,954 B2 * 11/2014 Schultz .................. C23C 24/06
228/2.1
11,370,058 B2 * 6/2022 Rodriguez ............. B33Y 40/00
(Continued)

FOREIGN PATENT DOCUMENTS

CN 109202274 A 1/2019
CN 112828441 A 5/2021
(Continued)

*Primary Examiner* — Erin B Saad (57) ABSTRACT

A solid state additive method includes: disposing a round consumable rod in a hollow stirring tool; based on a coating layer height, setting a gap between a bottom surface of the hollow stirring tool and a base surface; driving the hollow stirring tool to rotate at a first rotation speed; driving the consumable rod to rotate at a second rotation speed, where the second rotation speed and the first rotation speed are different in angular speed to form a differential, such that the consumable rod rubs against an inner wall of the hollow stirring tool to generate thermal deformation so as to obtain a plastic deformation flow in the hollow stirring tool; pressing the consumable rod downward to enable the plastic deformation flow to be in friction contact with the base surface; translating the hollow stirring tool and stirring the base surface.

12 Claims, 5 Drawing Sheets

(56) References Cited

U.S. PATENT DOCUMENTS

| | | | |
|---|---|---|---|
| 11,465,349 B2* | 10/2022 | Verma | B23K 20/126 |
| 11,642,838 B2* | 5/2023 | Lalande | B22F 10/30 |
| | | | 425/162 |
| 2012/0009339 A1* | 1/2012 | Creehan | B23K 20/1245 |
| | | | 427/180 |
| 2012/0279441 A1 | 11/2012 | Creehan et al. | |
| 2018/0361501 A1* | 12/2018 | Hardwick | B33Y 10/00 |
| 2020/0189025 A1* | 6/2020 | Rodriguez | B23K 20/22 |
| 2020/0306869 A1* | 10/2020 | Hardwick | B23K 20/1215 |
| 2020/0331203 A1* | 10/2020 | Verma | B29C 64/209 |
| 2021/0205916 A1* | 7/2021 | Senderos | B23K 20/1215 |
| 2021/0308937 A1* | 10/2021 | Broach | B29C 64/106 |
| 2021/0402506 A1* | 12/2021 | He | B23K 9/042 |
| 2021/0402507 A1* | 12/2021 | He | B23K 20/1255 |
| 2023/0146110 A1* | 5/2023 | Allison | B33Y 30/00 |
| | | | 228/112.1 |
| 2024/0175106 A1* | 5/2024 | Henderson | B33Y 10/00 |
| 2025/0162064 A1* | 5/2025 | Guo | B23K 20/122 |

FOREIGN PATENT DOCUMENTS

| | | |
|---|---|---|
| CN | 114131176 A | 3/2022 |
| CN | 114951954 A | 8/2022 |
| CN | 219379326 U | 7/2023 |

\* cited by examiner

SOLID STATE ADDITIVE METHOD

CROSS-REFERENCE TO RELATED APPLICATIONS

This application claims priority to Chinese Patent Application No. 2022112071638, filed on Sep. 30, 2022, and Chinese Patent Application No. 2022111134413, filed on Sep. 14, 2022, the entire disclosures of which are incorporated herein by reference.

TECHNICAL FIELD

The present application relates to the field of solid state additive technologies and in particular to a solid state additive method.

BACKGROUND

The solid state additive manufacturing refers to that, by using a hollow stirring tool internally filled with a consumable rod, the consumable rod is driven to rotate and horizontally move while moving downward relative to the hollow stirring tool to come in contact with an upper surface of a base material or an upper surface with a coating layer; further, the bottom end of the consumable rod moves relative to the base material to achieve violent friction and deformation and heat generation, so as to generate a plastic deformation flow and then form a coating layer in cooperation with a shaft shoulder of the hollow stirring tool, and then apply it to the base material.

On one hand, in the related arts, excessive downward pressure is required for the consumable rod, making it difficult to realize solid state additive manufacturing of high temperature alloys. In solid state additive manufacturing technology, the heat source is the violent deformation of the consumable rod under the action of rotary downward pressure in cooperation with the hollow stirring tool, and thus it is difficult for the materials having excellent high temperature performances such as high temperature alloys to realize violent deformation, leading to failure to apply the solid state additive manufacturing technology. In the existing methods, the consumable rod is required to receive large downward pressure to realize violet friction and heat generation, and the heat source in the additive process is on the end surface of the consumable rod and the end surface of the hollow stirring tool, and meanwhile, the large downward pressure limits the length of the consumable rod.

On the other hand, in the related arts, it is difficult to realize control of temperature in solid state additive manufacturing. The temperature control is very critical for the service life of the solid state additive tool. For example, heat accumulation in a solid state additive process may affect the service life of the stirring head and the performance of the additive products. Further, the excessively high temperature of a next coating layer may affect the microstructure of a previous coating layer and even the entire performance of the structural member.

Furthermore, in the existing solid state additive manufacturing technology, a rotation speed of the consumable rod is to be consistent with a rotation speed of the hollow stirring tool, and hence, the range of the parameters such as welding speed is not large and the parameters are not optimal for the stirring process.

Furthermore, the length of the consumable rod used in the previous solid state additive manufacturing process is too small and the consumable rod has to be changed frequently, leading to a lower working efficiency. In this case, it is difficult to prepare a large coating layer at one time.

Furthermore, the coating layer prepared by the solid state additive technology may not be at the central line of the stirring tool but offset to the advance side, adversely affecting accurate control of the shape of the solid state additive-components.

SUMMARY

The present application provides a solid state additive method to at least solve the problem of excessively large downward pressure required for a consumable rod and the difficulty in achieving solid state additive manufacturing of high temperature alloys in the related arts.

In order to achieve the above purpose, the technical solution of the present application is implemented below.

There is provided a solid state additive method in which a consumable rod forms a coating layer on a base surface. The base surface includes an upper surface of a base material or an upper surface with the coating layer. The solid state additive method includes the following steps:

disposing the consumable rod in a hollow stirring tool, where the consumable rod is round;

setting a gap between a bottom surface of the hollow stirring tool and the base surface based on a height of the coating layer;

driving the hollow stirring tool to rotate at a first rotation speed;

driving the consumable rod to rotate at a second rotation speed, where the second rotation speed and the first rotation speed are different in angular speed to form a differential, such that the consumable rod rubs against an inner wall of the hollow stirring tool to generate thermal deformation so as to obtain a plastic deformation flow in the hollow stirring tool, where a temperature of the plastic deformation flow is lower than a melting temperature of the consumable rod;

pressing the consumable rod downward to enable the plastic deformation flow to be in friction contact with the base surface; and translating the hollow stirring tool and stirring the base surface such that the plastic deformation flow forms a coating layer on the base surface.

In certain embodiments, a lower portion of the inner wall of the hollow stirring tool is formed into an outwardly-expanding horn mouth which decomposes a reactive force received by the inner wall of the hollow stirring tool due to expansion of the consumable rod into a transverse force and a vertical force.

In certain embodiments, an angle of the outward expansion is 0.1 to 7 degrees.

In certain embodiments, after the consumable rod is disposed in the hollow stirring tool, the method further includes:

obtaining a real-time temperature of the hollow stirring tool and/or the consumable rod in the hollow stirring tool;

determining whether the real-time temperature is lower than a preset temperature; if so, heating the hollow stirring tool and/or the consumable rod in the hollow stirring tool to enable the consumable rod to generate the plastic deformation flow.

In certain embodiments, in the heating step, the hollow stirring tool and/or the consumable rod in the hollow stirring tool is heated by at least one of an induction heater, flame jet heating, laser heating, ultrasonic vibration heating, plasma jet heating, or arc heating.

In certain embodiments, the method further includes:
obtaining a real-time temperature of the hollow stirring tool and/or the consumable rod in the hollow stirring tool; and
determining whether the real-time temperature is higher than the preset temperature;
if yes, cooling a bottom surface of the hollow stirring tool to adjust the temperature of the plastic deformation flow.

In certain embodiments, the bottom surface of the hollow stirring tool is cooled by air cooling.

In certain embodiments, the first rotation speed and the second rotation speed are in a same direction and the first rotation speed is lower than the second rotation speed.

In certain embodiments, the first rotation speed and the second rotation speed are opposite in direction, such that the plastic deformation flow of an advance side of the consumable rod is reversely pushed by the hollow stirring tool to an advance side of the hollow stirring tool.

In certain embodiments, the step of pressing the consumable rod downward to enable the plastic deformation flow to be in friction contact with the base surface includes:
radially supporting a middle portion of the consumable rod and then pressing the consumable rod downward to enable the plastic deformation flow to be in friction contact with the base surface.

In certain embodiments, the step of pressing the consumable rod downward to enable the plastic deformation flow to be in friction contact with the base surface includes:
radially supporting an upper end of the consumable rod and then pressing a top end of the consumable rod downward to enable the plastic deformation flow to be in friction contact with the base surface.

In certain embodiments, an inner wall of the horn mouth is disposed as ripple-shaped, and/or the bottom surface of the hollow stirring tool is non-planar.

In certain embodiments, a bottom of the hollow stirring tool is detachably connected with at least one stirring needle.

In certain embodiments, a material of the consumable rod is a metal alloy material, a metal-ceramic composite material, or an organic material.

In certain embodiments, the method further includes:
cooling the base material to reduce the temperature of the coating layer.

The present application has the following beneficial effects.

On one hand, since the hollow stirring tool is different in rotation speed from the consumable rod, the second rotation speed and the first rotation speed are different in angular speed so as to form a differential, such that the consumable rod rubs against the inner wall of the hollow stirring tool to generate thermal deformation. In this way, the consumable rod can form a plastic deformation flow before reaching the base surface. At this time, the consumable rod can form the plastic deformation flow without receiving any large downward pressure. In this method, the heat required for softening the material of the consumable rod does not fully depend on violent friction and deformation and heat generation of the consumable rod and the base surface, as mentioned in the related arts. Therefore, the downward pressure required for the additive coating layer can be significantly reduced. Further, due to the presence of the differential, the rotation speed of the consumable rod can be increased so as to increase the heat generated by the friction and thus the mechanical performance and the anticorrosion performance of the high temperature material coating layers such as high temperature alloy and cobalt-based alloys can be improved.

On the other hand, the differential adjusts the rotation speed of the hollow stirring tool and the rotation speed of the consumable rod to an optimal rotation range. Hence, a plastic deformation flow can be generated in the hollow stirring tool. In this way, the translation speed of the hollow stirring tool can be increased, the stirring effect of various coating layers can be optimized, and further, both the solid state additive efficiency and the mechanical performance of the coating layer can be improved.

Furthermore, the heating step can provide extra heat input to promote the softening of the high-temperature alloy material, so as to achieve the purpose of additive manufacturing. The extra heat input results in a significant positive impact on the solid state additive manufacturing of low-melt-point alloys (aluminum alloy, magnesium alloy, and copper alloy) and their composite materials. Furthermore, a smaller downward pressure is required for successful preparation during the solid state additive process of the high-melt-point alloys (for example, stainless steel, titanium alloy, nickel-based alloy, high and medium-entropy alloy, and cobalt-based alloy) as well as their composite material with ceramic or hard alloy as strengthening phase.

In the existing solid state additive temperature-adjustment method, the welding parameters such as rotation speed, feed speed, and layer thickness are adjusted to adjust the temperature of the plastic deformation flow, but the temperature reduction response is not sensitive. Based on the conventional method, in the present application, the heating and the cooling can be performed directly on the hollow stirring tool, shortening the cooling response time and achieving more sensitive temperature control.

Furthermore, by controlling the temperature of the base material, excess heat accumulated during the solid state additive process can be carried away to prevent the softening of the base material or a component below resulting from excess heat. Thus, sufficient rigid support cannot be provided for the solid state additive process, resulting in the failure of the additive process.

BRIEF DESCRIPTIONS OF THE DRAWINGS

In order to more clearly describe the technical solutions in the embodiments of the present application or in the related arts, the drawings required for descriptions of the embodiments or the related arts will be briefly introduced below. The drawings described herein are merely some embodiments of the present application. Those skilled in the art can obtain other drawings based on these drawings without making creative work.

DETAILED DESCRIPTIONS OF EMBODIMENTS

The embodiments of the present application will be detailed below with examples illustrated in the drawings. The same or similar numerals throughout represent the same or similar elements or elements having the same or similar functions. The embodiments described with reference to the drawings are only illustrative and used only for interpreting the present application rather than understood as limiting of the present application.

In the descriptions of the present application, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present invention.

Further, the terms "first" and "second" are used for descriptions only and shall not be understood as indicating or implying relative importance or implicitly indicating the number of the indicated features. As a result, the features defined by "first" and "second" may explicitly or implicitly include at least one feature. In the descriptions of the present invention, "several" refers to two or more, unless otherwise clearly stated.

In the present application, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present application according to actual situations.

In the present application, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

The present application will be further described below in combination with the drawings.

An embodiment of the present application provides a solid state additive method, in which a coating layer 30 is formed on a base surface by using a consumable rod 10. The base surface includes an upper surface of a base material 20 or an upper surface with the coating layer 30. The solid state additive method includes the following steps.

Figure 1:
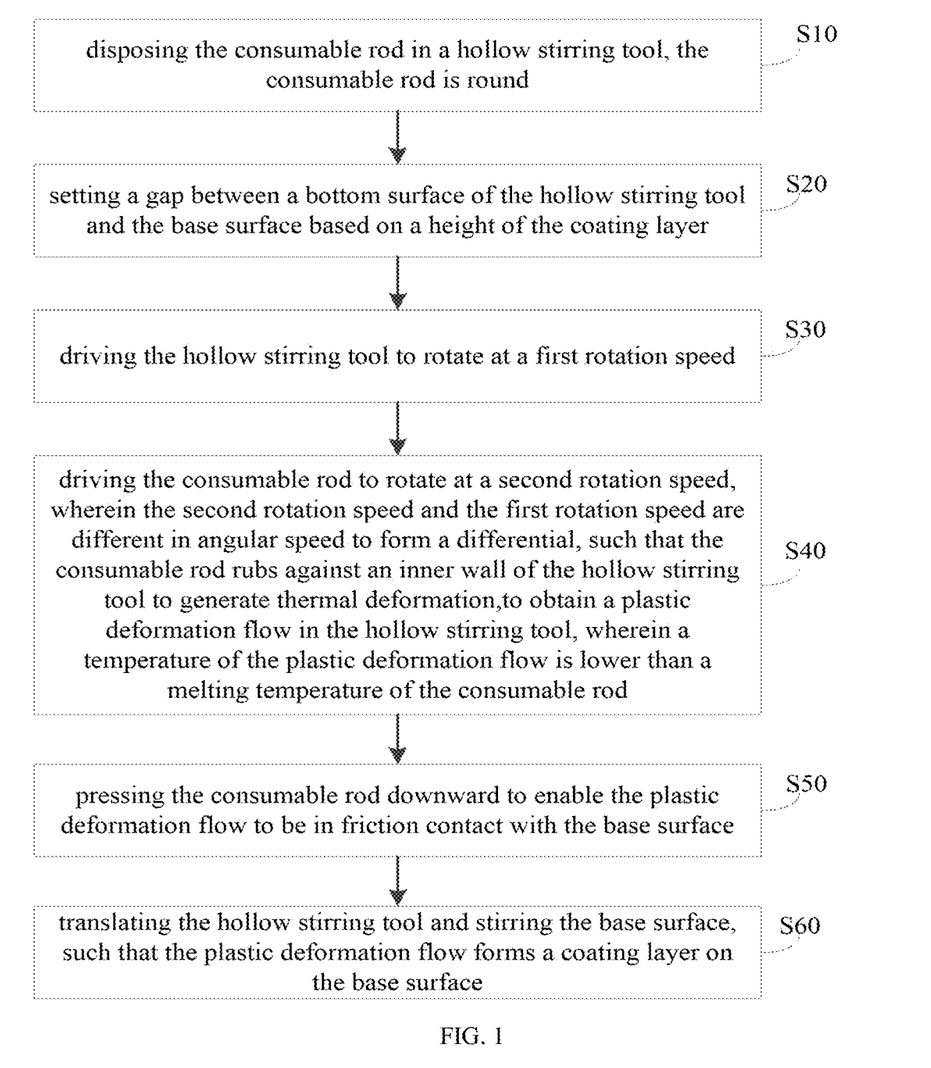
FIG. 1 is a flowchart illustrating a solid state additive method according to the present application.

At step S10, the consumable rod 10 is disposed in a hollow stirring tool 40, wherein, the consumable rod 10 is round.

At step S20, based on a height of the coating layer, a gap between a bottom surface of the hollow stirring tool 40 and the base surface is set.

At step S30, the hollow stirring tool 40 is driven to rotate at a first rotation speed.

At step S40, the consumable rod 10 is driven to rotate at a second rotation speed, where the second rotation speed and the first rotation speed are different in angular speed to form a differential, such that the consumable rod 10 rubs against an inner wall of the hollow stirring tool 40 to generate thermal deformation so as to obtain a plastic deformation flow in the hollow stirring tool 40, where a temperature of the plastic deformation flow is lower than a melting temperature of the consumable rod 10.

At step S50, the consumable rod 10 is pressed downward to enable the plastic deformation flow to be in friction contact with the base surface.

At step S60, the hollow stirring tool 40 is translated and the base surface is stirred such that the plastic deformation flow forms the coating layer 30 on the base surface.

In certain embodiments of the present application, the base material 20 may be an alloy plate with ordinary performance and the consumable rod 10 may be an alloy material with relatively excellent performance. For example, the base material 20 may be an aluminum alloy, stainless steel, 625 nickel-based alloy carbon steel, or the like. The consumable rod 10 may be 7A04 high-strength aluminum alloy, 904 super Austenitic stainless steel, 304 Austenitic stainless steel 718 nickel-based alloy, or the like.

In this embodiment, since the hollow stirring tool 40 is different in rotation speed from the consumable rod 10, the second rotation speed and the first rotation speed are different in angular speed so as to form a differential, such that the consumable rod 10 rubs against the inner wall of the hollow stirring tool 40 to generate thermal deformation. In this way, the consumable rod 10 can form a plastic deformation flow before reaching the base surface. Thus, the consumable rod 10 can form the plastic deformation flow without receiving any large downward pressure. In this method, the heat required for softening the material of the consumable rod 10 does not fully depend on violent friction and deformation and heat generation of the consumable rod 10 and the base surface, as mentioned in the related arts. Therefore, the downward pressure required for the additive coating layer 30 can be significantly reduced. Further, due presence of the differential, the rotation speed of the consumable rod 10 can be increased so as to increase the heat generated by the friction and thus the high temperature material such as high temperature alloys and cobalt-based alloys can have excellent mechanical performance and the anticorrosion performance.

On the other hand, the differential adjusts the rotation speed of the hollow stirring tool 40 and the rotation speed of the consumable rod 10 to an optimal rotation range. Hence, a plastic deformation flow can be generated in the hollow stirring tool 40. In this way, the translation speed of the hollow stirring tool 40 can be increased, and the stirring effect of various coating layers can be optimized, and further, both the solid state additive efficiency and the mechanical performance of the coating layer can be improved.

In certain embodiments, a lower portion of the inner wall of the hollow stirring tool 40 is formed into an outwardly-expanding horn mouth which decomposes a reactive force received by the inner wall of the hollow stirring tool 40 due to the expansion of the consumable rod 10 into a transverse force and a vertical force.

In this embodiment, due to the heat generated by the relative movement of the consumable rod 10 and the hollow stirring tool 40, the consumable rod 10 may expand and hence be stuck in the hollow stirring tool 40. By disposing the lower portion of the inner wall of the hollow stirring tool 40 as an outwardly-expanding horn mouth, the possibility that the consumable rod 10 is stuck in the hollow stirring tool 40 can be reduced or eliminated such that the plastic deformation flow is conveyed to an outlet end of the hollow stirring tool 40 under the downward pressure of the consumable rod 10 and then coated to the surface of the base material 20 or a previous coating layer 30 under the action of a shaft shoulder of the hollow stirring tool 40, so as to achieve the purpose of additive manufacturing. Furthermore, the consumable rod 10 can interact with the inner wall of the horn mouth to achieve violent plastic deformation and heat generation, helping the quick softening of the consumable rod 10 to form the plastic deformation flow. As a result, the downward pressure required by the consumable rod 10 is further reduced and the solid state additive efficiency is increased.

Furthermore, the outwardly-expanding angle of the horn moth is 0.1 to 7 degrees; the inner wall of the horn moth may be disposed as ripple-shaped and the bottom surface of the hollow stirring tool 40 can be disposed as non-planar, for example, as inwardly concave or outwardly convex or patterned so as to increase the roughness of the surface of the coating layer, helping better bonding of various coating layers.

In certain embodiments, after the consumable rod 10 is disposed in the hollow stirring tool 40, the method further step S70:
  obtaining a real-time temperature of the hollow stirring tool 40 and/or the consumable rod 10 in the hollow stirring tool 40;
  determining whether the real-time temperature is lower than a preset temperature; if yes, heating the hollow stirring tool 40 and/or the consumable rod 10 in the hollow stirring tool 40 or heating both of them to enable the consumable rod 10 to generate the plastic deformation flow.

The step S70 can be performed between various steps based on actual situations, for example, can be inserted after the step S20 or before the step S60.

The heating step can provide extra heat input to promote the softening of the high-temperature alloy material, so as to achieve the purpose of additive manufacturing. The extra heat input results in a significant positive impact on the solid state additive manufacturing of low-melt-point alloys (aluminum alloy, magnesium alloy, and copper alloy) and their composite materials and furthermore, a smaller downward pressure is required for successful preparation during the solid state additive process of the high-melt-point alloys (for example, stainless steel, titanium alloy, nickel-based alloy, high and medium-entropy alloy, and cobalt-based alloy) and their composite material with ceramic or hard alloy as strengthening phase.

In certain embodiments, in the heating step, the hollow stirring tool 40 and/or the consumable rod 10 in the hollow stirring tool 40 is heated by at least one of an induction heater, flame jet heating, laser heating, ultrasonic vibration heating, plasma jet heating, or arc heating.

In this step, on one hand, the hollow stirring tool 40 can be heated and then the heat is transferred to the consumable rod 10 for heating; further, the consumable rod 10 is made of alloy material, and thus it can also be heated by an inductance coil. In this case, the heat required for softening the material does not fully depend on violent deformation and heat generation of the consumable rod 10 as in the related arts. In this way, the downward pressure required for the solid state additive coating layer is reduced and the speed of translating the hollow stirring tool 40 can be increased, so as to increase the solid state additive efficiency. For those alloys such as high temperature alloys and cobalt-based alloys having excellent mechanical performance in the range near the melting point temperature, it is difficult to generate sufficient heat by the conventional solid state additive technology to melt them and generate a plastic deformation flow. The inductance coil heating can provide extra heat input to promote the softening of the high temperature alloy material, so as to achieve the purpose of additive manufacturing.

The heating assembly used in the heating step may include an inductance coil 50 sleeved around the hollow stirring tool 40 and a controller connected to the inductance coil 50 to control the temperature of the inductance coil 50.

The inductance coil 50 can surround the hollow stirring tool 40 in a spiral way and is located at a lower end of the hollow stirring tool 40 close to the base material 20. In this case, the plastic deformation flow generated by the consumable rod 10 heated by the inductance coil 50 can be directly coated onto the surface of the base material 20 or the previous coating layer 30. The controller is connected to the inductance coil 50 through a wire to control the temperature of the inductance coil.

As a preferred example of the present embodiment, the method further includes step S80:
  obtaining a real-time temperature of the hollow stirring tool and/or the consumable rod in the hollow stirring tool;
  determining whether the real-time temperature is higher than the preset temperature;
  if yes, cooling a bottom surface of the hollow stirring tool 40 to adjust the temperature of the plastic deformation flow.

The step S80 can be performed between various steps based on actual situations, for example, after the step S20 or before the step S60.

Preferably, the bottom surface of the hollow stirring tool 40 is preferably cooled by air cooling.

By cooling the bottom surface of the hollow stirring tool 40 to reduce the temperature of the hollow stirring tool 40, the service life of the hollow stirring tool 40 can be extended, and the performance of the additive product can be guaranteed.

Specifically, a cooling channel 41 may be disposed in the hollow stirring tool 40. The cooling channel 41 includes an internal flow path inside the hollow stirring tool 40, and an inlet and an outlet disposed at a sidewall of the hollow stirring tool 40 to connect both ends of the internal flow path. A cooling medium is input into the internal flow path through the inlet and discharged from the outlet after cooling the hollow stirring tool 40.

By heating and cooling, the temperature of the hollow stirring tool 40 and the temperature of the consumable rod 10 can be controlled in the solid state additive manufacturing process, and thus it can be applied to the solid state additive manufacturing of high-melt-point alloys.

In the solid state additive manufacturing process, the hollow stirring tool 40 usually has to serve for long times at a high temperature. When excess heat is accumulated, if not dissipated in time, the hollow stirring tool 40 will be heated up, which lowers its high-temperature mechanical performance, deteriorates the wear of the hollow stirring tool 40, and shortens its service life. Furthermore, excessively high temperature of the hollow stirring tool 40 and the coating layer may bring heat treatment effect on the coating layer below, for example, re-crystallization may occur to grow up the crystal grains of the previous coating layer and lower the mechanical performance, thus affecting the entire performance of the coating layer. Therefore, by cooling down the stirring tool, the service life of the stirring tool can be extended and the performance of the coating layer can be guaranteed.

Figure 6:
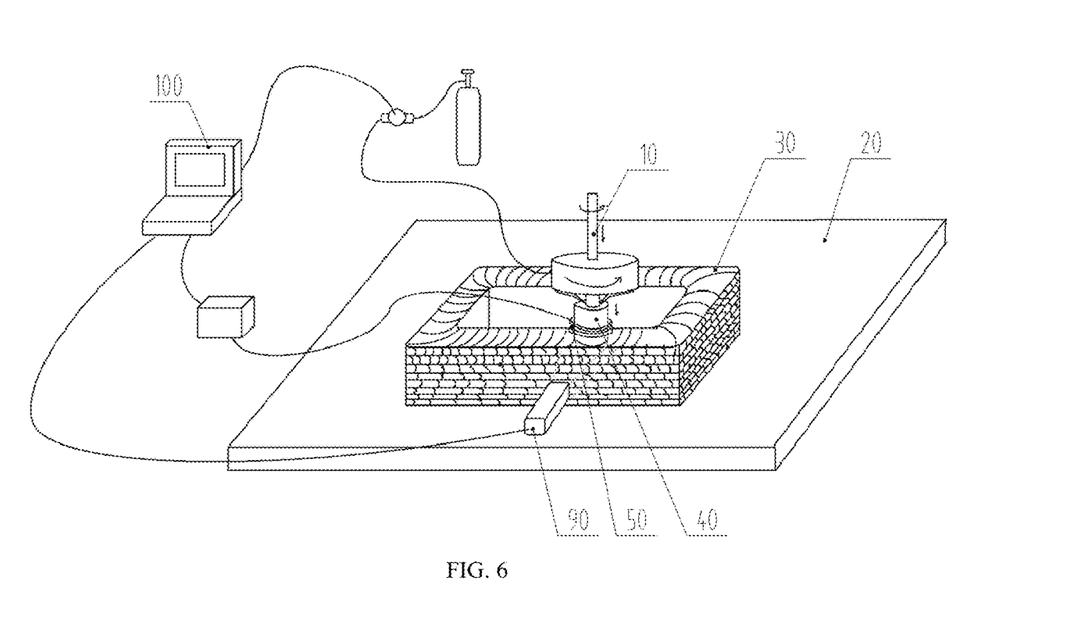
FIG. 6 is a structural schematic diagram illustrating a control device according to an embodiment of the present application.

The steps S70 and S80 both are used to perform real-time temperature monitoring by using, for example, a control device shown in FIG. 6. The control device may include a master control device 100 and a temperature detector 90 connected to the master control device 100. The controller includes a first control valve and a second control valve.

The master control device 100 may be an externally-connected computer, smart phone or tablet computer, and the temperature detector 90 may be a thermocouple or an infrared imager to measure the temperature of the hollow stirring tool 40 and/or the consumable rod 10 in the hollow stirring tool 40 in real time and send the measured temperature to the master control device 100. The first control valve disposed between the master control device 100 and the inductance coil 50 to control the temperature of the inductance coil, and the second control valve is connected through one end to the master control device 100 and through the other end to a storage tank holding the cooling medium and a cooling medium output pipe respectively.

The temperature detector 90 can obtain the temperature of the hollow stirring tool 40 and/or the consumable rod 10 in real time, and send the temperature information to the master control device 100. The master control device 100 determines, based on the temperature information, whether to heat or cool the hollow stirring tool 40 and/or the consumable rod 10. If the detected temperature value is greater than a preset temperature value, the master control device 100 controls the first control valve to be closed or to a smaller openness and/or controls the second control valve to be opened or to a larger openness to cool the hollow stirring tool 40 and/or the consumable rod 10. If the detected temperature value is less than the preset temperature value, the master control device 100 controls the first control valve to be opened or to a larger openness and/or controls the second control valve to be closed or to a smaller openness to heat the hollow stirring tool 40 and/or the consumable rod 10.

The temperature detector may be a thermocouple temperature-measuring apparatus or an infrared imaging temperature-measuring apparatus.

As a further preferred example of the present embodiment, the first rotation speed and the second rotation speed are in a same direction and the first rotation speed is lower than the second rotation speed.

In the present embodiment, since the consumable rod 10 is softened by the friction-generated heat to form a plastic deformation flow while the hollow stirring tool 40 only needs to provide a stirring force for the plastic deformation flow, the rotation speed of the consumable rod 10 is higher than the rotation speed of the hollow stirring tool 40, such that the consumable rod 10 and the hollow stirring tool 40 both can work within respective optimal rotation ranges. In this way, the solid state additive efficiency can be improved, the bonding force between various coating layers can be increased and further, the mechanical performance of the coating layer can be improved.

In certain embodiments, the first rotation speed and the second rotation speed are opposite in direction, such that the plastic deformation flow of an advance side of the consumable rod 10 is reversely pushed by the hollow stirring tool 40 to an advance side of the hollow stirring tool 40.

It is noted that when the consumable rod 10 rotates, seen from the direction away from the consumable rod 10, the side of its rotation direction is the advance side and the opposite side of the advance side is a reverse side. For example, when the consumable rod 10 rotates clockwise, seen from the direction away from the consumable rod 10 ($V_2$ direction in FIG. 2), the advance side is at the left side of the consumable rod 10 (the upper left in FIG. 2).

Figure 2:
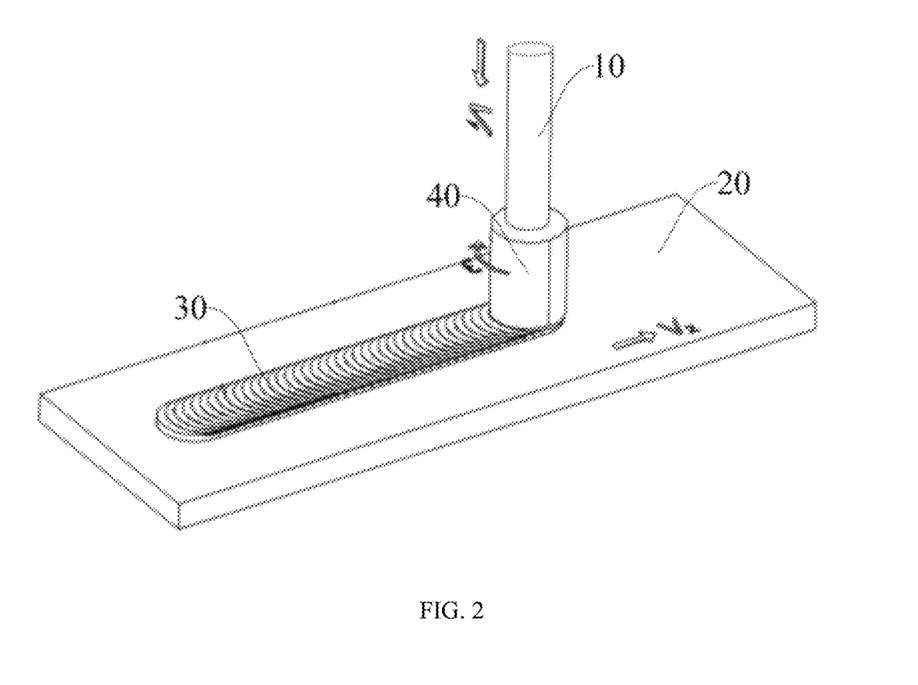
FIG. 2 is an operation schematic diagram illustrating a solid state additive method according to an embodiment of the present application.
Figure 3:
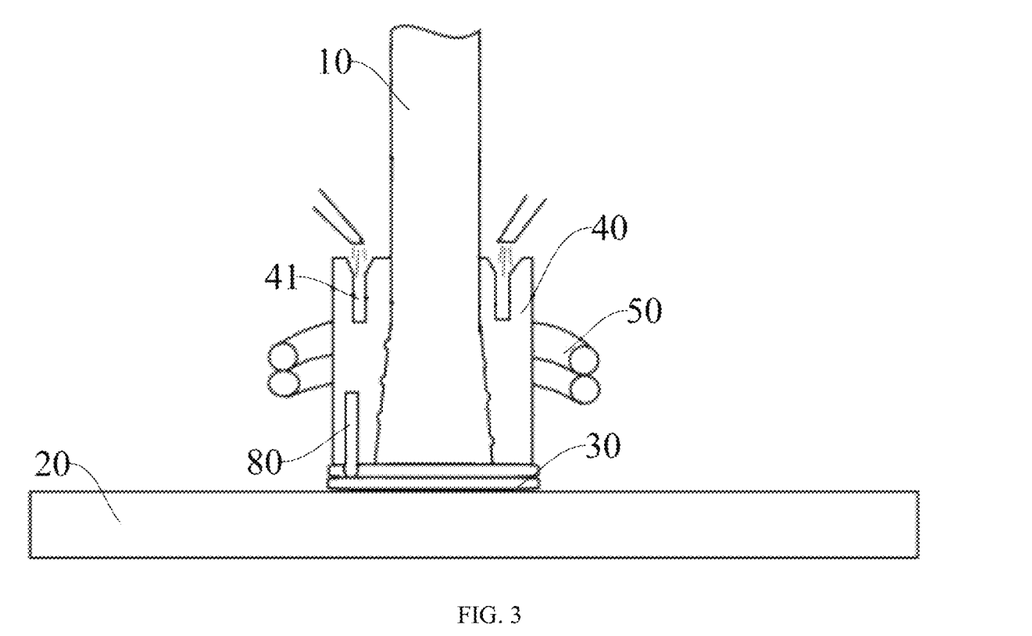
FIG. 3 is an operation schematic diagram illustrating a solid state additive method according to a first embodiment of the embodiments of the present application.

When the rotation directions of the hollow stirring tool 40 and the consumable rod 10 are opposite, the effect of the offset of the coating layer 30 toward the advance side will be counteracted. In other words, the plastic deformation flow generated by the consumable rod 10 is moved toward the advance side of the consumable rod 10 under the drive of the consumable rod 10, but will be immediately pushed to the advance side of the hollow stirring tool 40 by the reversely-rotating hollow stirring tool 40. In this way, the central position of the coating layer 30 will be located at the position of the centerline of the hollow stirring tool 40 and the consumable rod 10.

In certain embodiments of the present application, the step of pressing the consumable rod 10 downward to enable the plastic deformation flow to be in friction contact with the base surface includes:

radially supporting a middle portion of the consumable rod 10 and then pressing the consumable rod 10 downward to enable the plastic deformation flow to be in friction contact with the base surface.

Figure 4:
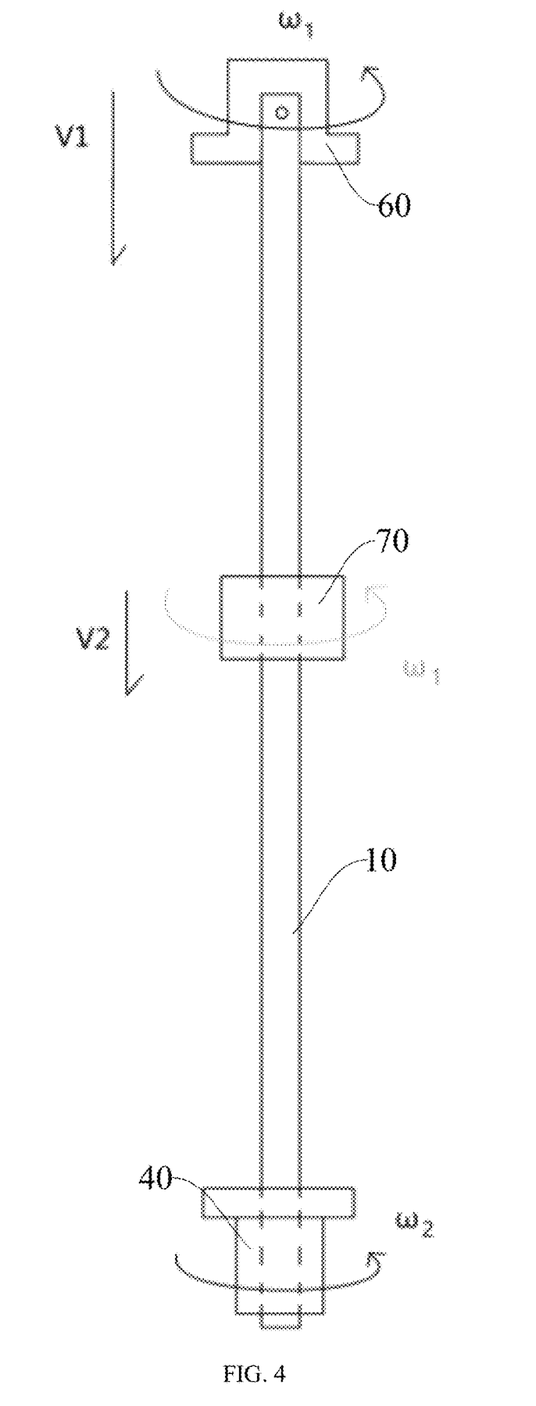
FIG. 4 is an operation schematic diagram illustrating a solid state additive method according to a second embodiment of the embodiments of the present application.
Figure 5:
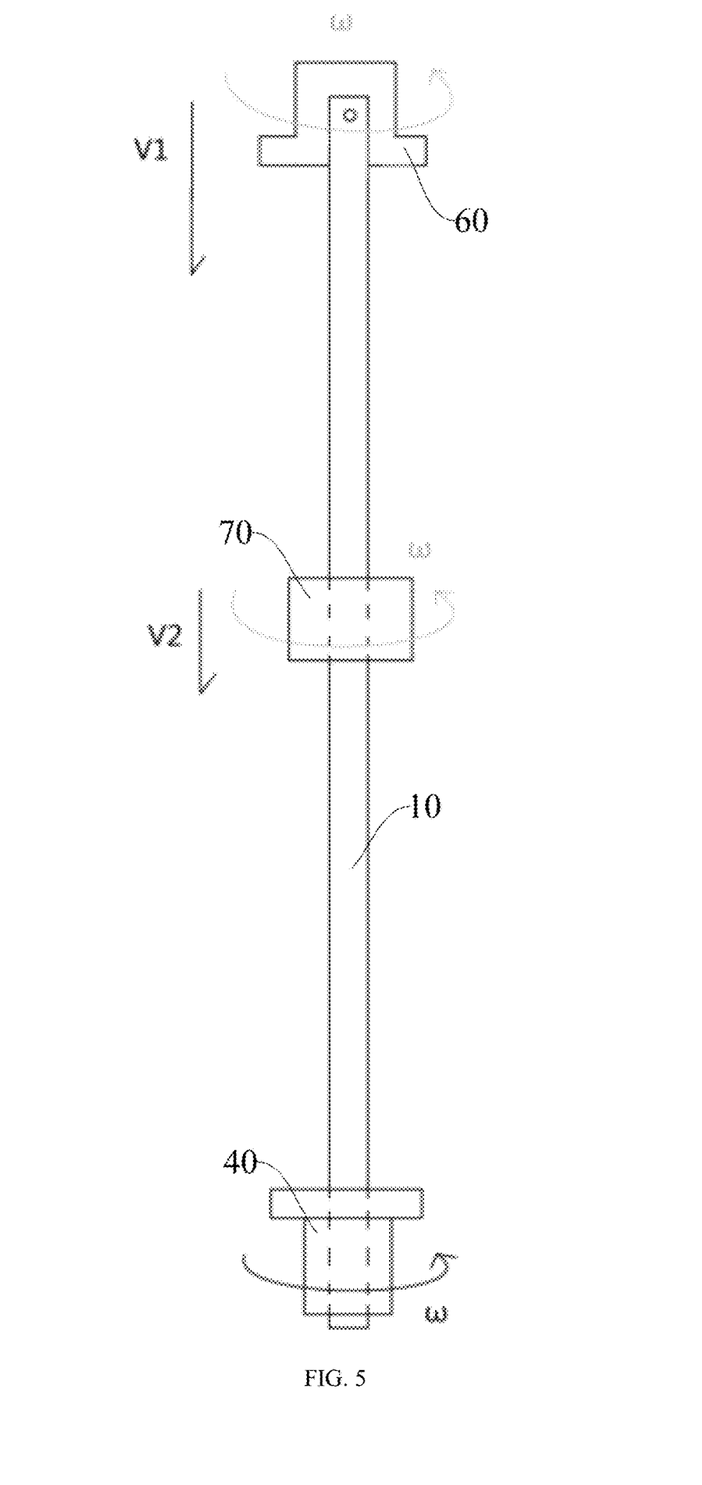
FIG. 5 is an operation schematic diagram illustrating a solid state additive method according to a third embodiment provided by the embodiments of FIG. 4.

The middle portion of the consumable rod 10 can be radially supported by using a middle support piece 70 shown in FIG. 4. One end of the middle support piece 70 is sleeved on the consumable rod 10 and can slide axially along the consumable rod 10. Thus, a support position can be adjusted based on the change of the length of the consumable rod 10 such that the middle support piece 70 can always be maintained at the middle position of the unconsumed consumable rod 10.

In the present embodiment, by supporting the middle portion of the consumable rod 10, excessively large deflection of the middle portion of the consumable rod 10 during a solid state additive process can be prevented and thus excessively large bend of the middle portion of the consumable rod 10 can be avoided.

In certain embodiments, the step of pressing the consumable rod 10 downward to enable the plastic deformation flow to be in friction contact with the base surface includes:

radially supporting an upper end of the consumable rod 10 and then pressing a top end of the consumable rod downward to enable the plastic deformation flow to be in friction contact with the base surface.

The upper end of the consumable rod 10 can be radially supported by using a top support piece 60 shown in FIG. 4. The top support piece 60 includes a positioning sleeve fixedly connected to the top end of the consumable rod 10 and a support seat sleeved around the positioning sleeve, where the support seat can rotate relative to the positioning sleeve and can bring the positioning sleeve to move vertically so as to press the consumable rod 10 downward to enable the plastic deformation flow to be in friction contact with the base surface.

In the present embodiment, by supporting the upper end of the consumable rod 10, shaking of the consumable rod 10 during movement can be prevented so as to improve its stability. Furthermore, with the middle support piece 70 and the top support piece 60, the solid state additive apparatus can be loaded with a longer consumable rod 10 so as to prepare a larger part at one time.

In certain embodiments, the bottom of the hollow stirring tool 40 is detachably connected with at least one stirring needle 80.

At least one stirring needle 80 is disposed. In the case of two needles, they are respectively disposed at different positions along a radial direction of the body of the hollow stirring tool 40. By stirring the coating layer 30 below using the stirring needle 80, better bonding between the coating layers can be achieved. The stirring needle 80 may be cylindrical or have a bottom with a sharp corner to reduce the resistance during the stirring process. The stirring needle 80 may be detachably connected to the bottom end of the hollow stirring tool 40 by insertion or thread or the like, so as to facilitate the removal of the stirring needle 80 for change. Furthermore, the stirring needle 80 can be extended to outside of the hollow stirring tool 40 to adapt to the solid state additive manufacturing of different materials.

In certain embodiments, a material of the consumable rod 10 is a metal alloy material, a metal-ceramic composite material, or an organic material.

In some embodiments, the method further includes: cooling the base material 20 to reduce the temperature of the coating layer 30.

The base material 20 can be cooled by water cooling, air cooling, or the like. Specifically, a clamping seat may be disposed at the bottom of the base material 20 and a cooling flow path is disposed in the clamping seat and located below the base material 20. A flow inlet and a flow outlet communicating with both ends of the cooling flow path respectively are disposed at a sidewall of the clamping seat. A cooling medium flows into the cooling flow path through the flow inlet and out of the cooling flow path through the flow outlet, and thus, heat dissipation can be performed on the base material 20 and the coating layer 30 below to prevent the base material 20 and/or the coating layer 30 below from being overheated and softened, avoiding the entire collapse of the coating layer.

The above descriptions are made on the basic principle, the main features, and the advantages of the present application. Those skilled in the arts should know that the present application is not limited to the above embodiments and the above embodiments are used to only illustrate the principle of the present application. Without departing from the spirit and scope of the present application, various changes and improvements can be made. These changes and improvements shall fall within the scope of protection of the present application. The scope of protection of the present application is defined by the appended claims and its equivalents.

What is claimed is:

1. A solid state additive method, forming a coating layer on a base surface by using a consumable rod, wherein the method comprises:
    disposing the consumable rod in a hollow stirring tool, wherein, a cross-section of the consumable rod is round;
    setting a gap between a bottom surface of the hollow stirring tool and the base surface based on a height of the coating layer;
    driving the hollow stirring tool to rotate at a first rotation speed;
    driving the consumable rod to rotate at a second rotation speed, wherein the second rotation speed and the first rotation speed are different in angular speed to form a differential, such that the consumable rod rubs against an inner wall of the hollow stirring tool to generate thermal deformation, to obtain a plastic deformation flow in the hollow stirring tool, wherein a temperature of the plastic deformation flow is lower than a melting temperature of the consumable rod;
    pressing the consumable rod downward to enable the plastic deformation flow to be in friction contact with the base surface; and
    translating the hollow stirring tool and stirring the base surface, such that the plastic deformation flow forms a coating layer on the base surface.

2. The solid state additive method of claim 1, wherein after the consumable rod is disposed in the hollow stirring tool, the method further comprises:
    obtaining a real-time temperature of the hollow stirring tool and/or the consumable rod in the hollow stirring tool; and
    determining whether the real-time temperature is lower than a preset temperature; if yes, heating the hollow stirring tool and/or the consumable rod in the hollow stirring tool to enable the consumable rod to generate the plastic deformation flow.

3. The solid state additive method of claim 2, wherein in the heating step, the hollow stirring tool and/or the consumable rod in the hollow stirring tool is heated by at least one of an induction heater, flame jet heating, laser heating, ultrasonic vibration heating, plasma jet heating or arc heating.

4. The solid state additive method of claim 1, further comprising:
    obtaining a real-time temperature of the hollow stirring tool and/or the consumable rod in the hollow stirring tool;
    determining whether the real-time temperature is higher than the preset temperature; if yes, cooling a bottom surface of the hollow stirring tool to adjust the temperature of the plastic deformation flow; and
    wherein the bottom surface of the hollow stirring tool is preferably cooled by air cooling.

5. The solid state additive method of claim 1, wherein the first rotation speed and the second rotation speed are in a same direction and the first rotation speed is lower than the second rotation speed.

6. The solid state additive method of claim 1, wherein the first rotation speed and the second rotation speed are opposite in direction, such that the plastic deformation flow of an advance side of the consumable rod is reversely pushed by the hollow stirring tool to an advance side of the hollow stirring tool.

7. The solid state additive method of claim 1, wherein the step of pressing the consumable rod downward to enable the plastic deformation flow to be in friction contact with the base surface comprises:
    radially supporting a middle portion of the consumable rod and then pressing the consumable rod downward to enable the plastic deformation flow to be in friction contact with the base surface.

8. The solid state additive method of claim 1, wherein the step of pressing the consumable rod downward to enable the plastic deformation flow to be in friction contact with the base surface comprises:
 radially supporting an upper end of the consumable rod and then pressing a top end of the consumable rod downward to enable the plastic deformation flow to be in friction contact with the base surface.

9. The solid state additive method of claim 1, wherein the bottom surface of the hollow stirring tool is non-planar.

10. The solid state additive method of claim 1, wherein a bottom of the hollow stirring tool is detachably connected with at least one stirring needle.

11. The solid state additive method of claim 1, wherein a material of the consumable rod is a metal alloy material, a metal-ceramic composite material, or an organic material.

12. The solid state additive method of claim 1, further comprising:
 cooling the base material to reduce the temperature of the coating layer.

\* \* \* \* \*